(12) United States Patent
Bender et al.

(10) Patent No.: US 9,934,228 B2
(45) Date of Patent: *Apr. 3, 2018

(54) INDEX SUSPENSION PRIOR TO DATABASE UPDATE

(71) Applicant: International Business Machines Corporation, Armonk, NY (US)

(72) Inventors: Michael Bender, Rye Brook, NY (US); Wayne M. Delia, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 486 days.

This patent is subject to a terminal disclaimer.

(21) Appl. No.: 14/477,904

(22) Filed: Sep. 5, 2014

(65) Prior Publication Data

US 2016/0070745 A1    Mar. 10, 2016

(51) Int. Cl.
G06F 17/30    (2006.01)

(52) U.S. Cl.
CPC .. *G06F 17/30094* (2013.01); *G06F 17/30129* (2013.01); *G06F 17/30374* (2013.01)

(58) Field of Classification Search
None
See application file for complete search history.

(56) References Cited

U.S. PATENT DOCUMENTS

| | | |
|---|---|---|
| 6,662,176 B2 | 12/2003 | Brunet et al. |
| 6,721,749 B1 * | 4/2004 | Najm ............... G06F 17/30563 |
| 7,028,022 B1 | 4/2006 | Lightstone et al. |
| 7,308,456 B2 | 12/2007 | Friske et al. |
| 7,734,602 B2 | 6/2010 | Folkert et al. |
| 7,778,985 B2 | 8/2010 | Scholtz |
| 7,779,045 B2 | 8/2010 | Mohamed et al. |
| 7,788,985 B2 | 9/2010 | Johnson et al. |
| 7,966,283 B2 | 6/2011 | Kilmartin |
| 8,433,680 B2 | 4/2013 | Ling et al. |
| 9,459,969 B1 | 10/2016 | Hebbar et al. |
| 2005/0223027 A1 | 10/2005 | Lawrence et al. |

(Continued)

OTHER PUBLICATIONS

Disable and re-enable all indexes in a SQL Server database, p. 4-5, answered by Phillip Kelly (hereafter Kelly), http://stackoverflow.com/questions/18236055/disable-and-re-enable-all-indexes-in-a-sql-server-database, Aug. 2014.*

(Continued)

*Primary Examiner* — Robert Beausoliel, Jr.
*Assistant Examiner* — Hau H Hoang
(74) *Attorney, Agent, or Firm* — Isaac J. Gooshaw

(57) ABSTRACT

Embodiments of the present invention disclose a method, a computer program product, and a computer system for suspending and activating a database index. A computer determines a quantity of changes for a number of rows of a database that are to be made by an update of the database. The computer determines whether to suspend an index of the database based, at least in part, on a comparison between the quantity of changes and a pre-determined threshold value. The computer suspends the index of the database based on a result of the comparison that indicates the quantity of changes at least meet the pre-determined threshold value. A suspension of the index of the database initiates a rebuilding of the index.

20 Claims, 4 Drawing Sheets

(56) References Cited

U.S. PATENT DOCUMENTS

| | | | |
|---|---|---|---|
| 2005/0235004 A1* | 10/2005 | Folkert | G06F 17/30457 |
| 2008/0307009 A1 | 12/2008 | Anderson et al. | |
| 2010/0281005 A1* | 11/2010 | Carlin | G06F 17/30312 |
| | | | 707/696 |
| 2013/0018890 A1 | 1/2013 | Rajan et al. | |
| 2015/0186441 A1 | 7/2015 | Chang et al. | |

OTHER PUBLICATIONS

Appendix P List of IBM Patents or Patent Applications Treated As Related.

U.S. Appl. No. 14/477,924, entitled "Automated Suspension and Rebuilding of Database Indices", filed Sep. 5, 2014.

U.S. Appl. No. 15/042,501, filed Feb. 12, 2016; Entitled "Index Suspension Prior to Database Update".

List of IBM Patents or Patent Applications Treated As Related; Dated Feb. 17, 2016; 2 pages.

Internet Society et al., "The Architecture of the Common Indexing Protocol (CIP) (RFC2651)", Original Publication Date: Aug. 1, 1999, IP.com No. IPCOM000003240D, IP.com Electronic Publication: Sep. 13, 2000, Copyright (C) The Internet Society (1999).

IBM et al., "A Method and System to Enhance Query Performance by Autonomically Creating and Deleting Database Indices at Runtime", Original Publication Date: Sep. 24, 2003, IP.com No. IPCOM000019661D, IP.com Electronic Publication: Sep. 24, 2003, pp. 1-3.

IBM, "Changing GPFS disk states and parameters", IBM, GPFS Administration and Programming Reference SA23-2221-08, Accessed on Jan. 15, 2014, Copyright IBM Corporation 1990, 2013, 2 pages, <https://www.ibm.com/support/knowledgecenter/SSFKCN_4.1.0/com.ibm.cluster.gpfs.v4r1.gpfs100.doc/bl1adm.chdisk.htm>.

Lynge, Ole, "How do I monitor and find unused indexes in sql database", Stack Overflow, Asked Sep. 21, 2009 at 19:53, 6 pages, <http://stackoverflow.com/questions/1456496/how-do-i-monitor-and-find-unused-indexes-in-sql-database>.

"13.1.2. Alter Table Syntax", MySQL 3.23, 4.0, 4.1 Reference Manual, 13 SQL Statement Syntax, User Comment posted by Tom S on Dec. 18, 2002 4:27 PM, © 1995-2005 MySQL AB, 8 pages, <http://web.archive.org/web/20051202071102/http://dev.mysql.com/doc/refman/4.1/en/alter-table.html>.

* cited by examiner

US 9,934,228 B2

INDEX SUSPENSION PRIOR TO DATABASE UPDATE

BACKGROUND OF THE INVENTION

The present invention relates generally to the field of indexing data, and more particularly to suspending a database index in a data processing system.

Computer databases allow the storage of digital data in an organized format that allows searches to retrieve a particular subset of data utilizing specialized commands in a query language, such as Structured Query Language (SQL). SQL enables data entry, manipulation, and deletion within database tables. Client applications may generate SQL statements based on user input. Stored database procedures may include SQL statements, which run either on a schedule or on request by a Database Administrator (DBA). The SQL is executed by a Database Management System (DBMS), which is a software system designed to control access and allow administration of a database. A query describes the data being requested from the database, but does not define the best path for retrieving that data from the database. A query optimizer defines the most efficient way to execute a given query within a database system.

In a database environment, the query optimizer utilizes database indices to determine the best path for a DBMS to access specific data in a database table. Indices enable a query to locate data quickly without having to search entire rows of a database table. A database index is a data structure that improves the speed of data retrieval operations on a database table by storing a copy of one or more selected columns of data from a table along with a pointer back to the complete row of data from which the column item was copied. Some indices are for special use and, as such, only create entries for records satisfying a selected condition, function, or expression, for example, indices created for a specific customer. In some cases, databases may have multiple indices covering a single database table. Each index is stored as a separate searchable entity from the data in the database tables. The DBMS maintains each index by incrementally updating the index as information is inserted into, removed from, and updated in the rows of the database tables. When processing large volumes of updates to a database, the DBA may manually delete an index, and then rebuild the index at the end of processing rather than performing the incremental updates during the large volume load.

SUMMARY

Embodiments of the present invention disclose a method, a computer program product, and a computer system for suspending and activating a database index. A computer determines a quantity of changes for a number of rows of a database that are to be made by an update of the database. The computer determines whether to suspend an index of the database based, at least in part, on a comparison between the quantity of changes and a pre-determined threshold value. The computer suspends the index of the database based, at least in part, on a result of the comparison that indicates the quantity of changes at least meet the pre-determined threshold value. A suspension of the index of the database initiates a rebuilding of the index.

DETAILED DESCRIPTION

Figure 1:
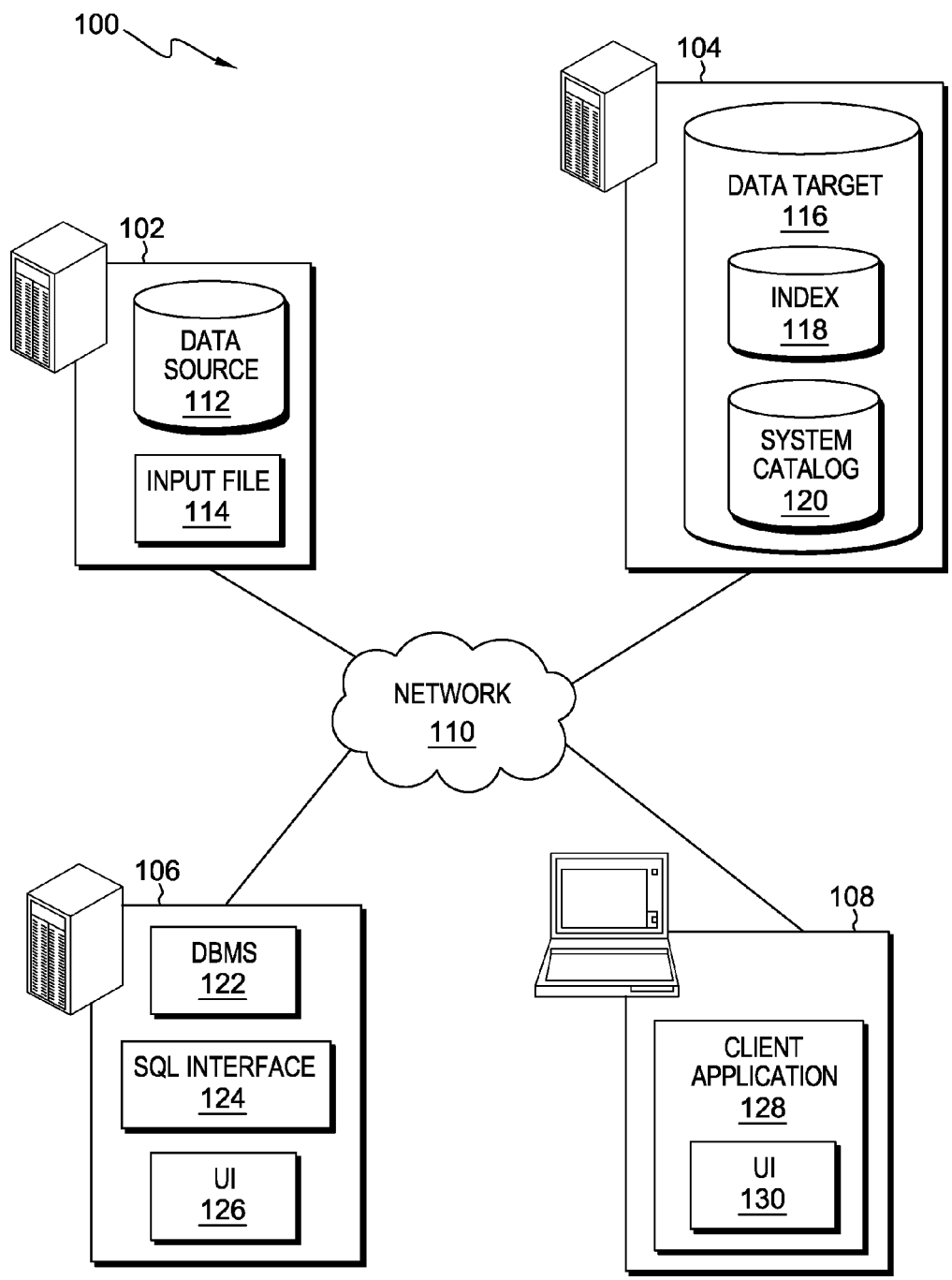
FIG. 1 is a functional block diagram illustrating a distributed data processing environment, in accordance with an embodiment of the present invention.

If large volumes of database updates are expected (e.g., such as during an extract, transform, load (ETL) application), then database administrator typically delete the indices manually for affected database tables, and rebuild the indices after the large volumes of data are loaded into the table. In accordance with the present invention, embodiments recognize a database administrator (DBA) typically makes the decision to suspend a database index without consideration of the volume of updates scheduled. In an embodiment, the DBA deletes the database index before the updates, and then rebuild the database index after the performed updates, even though allowing incremental updating of the database index would take less time for a low volume of updates. An embodiment, in accordance with the present invention, recognizes that rebuilding database indices only when needed, and automating the suspension, and actuating (or rebuilding) of indices increases efficiencies associated with valuable computing resources and improves throughput of database administrators.

In accordance with the present disclosure, embodiments provide for a database management system (DBMS) performing an index suspension analysis based on the pending quantity of changes or updates to a database. Such a DBMS determines to suspend an index based, at least in part, on the calculation of an index suspension value, and the subsequent comparison of the index suspension value to a threshold value. In one embodiment, a DBMS determines the index suspension value from a fixed count of updates (e.g., the volume of updates scheduled for a database or a data table). In another embodiment, the DBMS calculates the index suspension value as a fraction or percentage of updates to the database or data table. Embodiments provide for a suspension process, which retains metadata defining the suspended index to allow for quick rebuilding of the index. Some embodiments include requests for suspension of an index, which include a sub-set of available indices for a database table. In some embodiments, the sub-set of indices includes an inclusion or exclusion list. Embodiments include requests for suspension of an index utilizing temporal limits. In one embodiment, the DBMS receives a request for index suspension analysis through an enhanced ETL application.

In another embodiment, the DBMS receives a request for index suspension analysis through an enhanced Structured Query Language (SQL) command. The DBMS includes an SQL interface capable of index suspension analysis through the interaction of a relational database and query statements, using SQL as the query language. Specific details disclosed herein are not to be interpreted as limiting, but merely as a representative basis for teaching one skilled in the art to employ the methods and structures of the present disclosure. Some embodiments apply to all database types, including but not limited to relational, hierarchical, network, and object-oriented databases. Likewise, certain embodiments apply to other query languages, including but not limited to SQL, QUEL, OQL, and SEQUEL. Specific details disclosed herein are not to be interpreted as limiting, but merely as a representative basis for teaching one skilled in the art to employ the methods and structures of the present disclosure. Implementation of various embodiments take a variety of forms, and implementation details are discussed subsequently with reference to the Figures.

The present invention will now be described in detail with reference to the Figures. FIG. 1 is a functional block diagram illustrating a distributed data processing environment, generally designated 100, in accordance with an embodiment of the present invention. Distributed data processing environment 100 includes server computers 102, 104, and 106, and client computer 108, interconnected over network 110. In some embodiments, distributed data processing environment 100 includes additional server computers, client computers, or other devices not shown.

Network 110 is, for example, a local area network (LAN), a wide area network (WAN) such as the Internet, or a combination of the two, and includes one or more of wired, wireless, fiber optic, or any other connection known in the art. In general, network 110 is any combination of connections and protocols that support communications between server computers 102, 104, and 106, and client computer 108, in accordance with an embodiment of the present invention.

Server computers 102, 104, and 106, are each respectively a server computer, an application server, a laptop computer, a tablet computer, a netbook computer, a personal computer (PC), a desktop computer, a personal digital assistant (PDA), a smart phone, or any programmable electronic device capable of communicating with client computer 108, and each other via network 110. In certain embodiments, server computers 102, 104, and 106, each respectively represent a computer system utilizing clustered computers and components that act as a single pool of seamless resources when accessed through network 110, as is common in data centers and with cloud computing applications. In an embodiment, server computers 102, 104, and 106, each represent a node in a distributed database management environment. In general, in an embodiment, server computers 102, 104, and 106, are each respectively representative of any computing device or a combination of devices with respective access to database management system (DBMS) 122, data source 112, input file 114, and data target 116, and server computer 106 is capable of executing DBMS 122. In an embodiment, server computers 102, 104, and 106 each include internal and external hardware components, as depicted and described in further detail with respect to FIG. 4.

Server computer 102 includes an instance of data source 112. In an embodiment, data source 112 includes one or more of the following: a relational database, flat files, comma-separated text, a non-relational database, hierarchical databases, or other data structures such as Virtual Storage Access Method (VSAM), and Indexed Sequential Access Method (ISAM). In an embodiment, one or both of DBMS 122 and client application 128 collect data from various sources, such as data source 112. The collected data each have differing formats of data organization, and are transformed into a single data format to use for validation processing and loading into data target 116 on server computer 104. One skilled in the art will recognize that there are many other types of data sources available for use by ETL tools.

Server computer 102 includes an instance of input file 114. In an embodiment, input file 114 is a large external data file, which contains updates or changes to data target 116. DBMS 122 imports or processes the changes recorded in input file 114 during an ETL operation.

Server computer 104 includes an instance of data target 116. In an embodiment, data target 116 includes at least one of a relational database, a non-relational database, hierarchical databases, or any other data structure utilizing one or more indices for optimizing queries on the data within data target 116. In an embodiment, one or both of DBMS 122 and client application 128 collect data from data source 112, located on server computer 102. In an embodiment, one or both of DBMS 122 or client application 128 transforms the collected data into a single data format allowing for validation processing and loading into data target 116 on server computer 104. In an embodiment, data target 116 includes one or more database tables (not shown), one or more indices, such as index 118, and system catalog 120. In an embodiment, index 118 includes one or more columns from the database tables, or pointers, to one or more columns in the database tables. In an embodiment, system catalog 120 includes metadata, which defines database objects, such as a database table, index 118, user ID's, and user groups of data target 116. In other words, the metadata is data describing data and the organization of data included in data target 116. In an embodiment, the metadata within system catalog 120 allows DBMS 122 to rebuild index 118 when required. In an embodiment, system catalog 120 includes a status flag (not shown) for each index. In an embodiment, the status flag includes an indication of the status of index 118 as either ACTIVE, SUSPEND, or SUSPEND-PENDING. One skilled in the art will recognize that, in accordance with an embodiment, the status is indicated using one or more of text or numbers, and does not require the usage of the words ACTIVE or SUSPEND. In one embodiment, system catalog 120 retains the metadata for rebuilding index 118 when the status flag is updated to indicate SUSPEND, and index 118 is either deleted or emptied of contents.

Server computer 106 includes an instance of a relational database management system, such as DBMS 122, and a connection to data source 112 and data target 116. In the depicted environment, DBMS 122 is a suite of database management applications that allow the definition, creation, querying, updating, and administration of databases, such as data source 112 and data target 116. In other embodiments, DBMS 122, data source 112, and data target 116 are on one of a single computer or a plurality of computers. In one embodiment, at least one of DBMS 122, data source 112, or data target 116 exists as a plurality of parts or modules. DBMS 122 interacts with a user via user interface (UI) 126, with other applications such as client application 128 on client computer 108, and with at least a database, such as data source 112 on server computer 102 and data target 116 on server computer 104.

In an embodiment, DBMS 122 receives and processes queries that store, update, or retrieve data in the one or more tables residing in data source 112 and data target 116, and sends values associated with the query back to the requestor, such as client application 128 on client computer 108 via network 110. In one embodiment, DBMS 122 includes a query optimizer to generate the most efficient access path to execute queries on data target 116 utilizing index 118. DBMS 122 includes the functionality to create, update, and delete indices of data target 116, such as index 118 for the table, within distributed data processing environment 100. In various embodiments, DBMS 122 allows a user to suspend and later activate an index of a database table using, for example, SQL commands. In one embodiment, DBMS 122 stores the status of index 118 indicated as ACTIVE, SUS- PEND, or SUSPEND-PENDING in the status flag within system catalog 120 of data target 116 on server computer 104. In one embodiment, DBMS 122 reads data from the table via queries optimized with index 118 while index 118 is in the ACTIVE or SUSPEND-PENDING mode.

In one embodiment, server computer 106 includes an instance of Structured Query Language (SQL) interface 124 that is included as a component of DBMS 122, e.g., as an application programming interface (API). In one embodiment, SQL interface 124 allows DBMS 122 to interpret and execute queries or SQL commands comprising parameters for performing index suspension analysis prior to loading data into data target 116.

In one embodiment, server computer 106 includes an instance of a user interface. For example, in one embodiment, server computer 106 includes UI 126, within DBMS 122, which utilizes a web page application, a command line processor, or another graphical user interface (GUI). In one embodiment, UI 126 includes components used to receive input from a user of server computer 106 and transmit the input to DBMS 122. In an embodiment, UI 126 uses a combination of technologies and devices, such as device drivers, to provide a platform to enable users of server computer 106 to interact with DBMS 122. In one embodiment, UI 126 receives input, such as dragging and dropping data icons onto a workspace using a physical input device, such as a keyboard or mouse, via a device driver that corresponds to the physical input device. In another embodiment, UI 126 receives input, such as typed SQL commands or statements from a user of server computer 106, through a keyboard.

In various embodiments, client computer 108 is one of a laptop computer, a tablet computer, an application server, a netbook computer, a personal computer (PC), a desktop computer, a personal digital assistant (PDA), a smartphone, or any programmable electronic device capable of communicating with server computers 102, 104, and 106 via network 110. In general, client computer 108 is representative of any computing device, or a combination of devices, with access to client application 128, and is capable of executing client application 128. In some embodiments, one or more of DBMS 122, client application 128, data source 112, and data target 116 are located on one computer. In one embodiment, client computer 108 includes internal and external hardware components, as depicted and described in further detail with respect to FIG. 4.

In one embodiment, client computer 108 includes an instance of client application 128. In one embodiment, client application 128 executes locally on client computer 108 and has the capability to access DBMS 122 on server computer 106 via network 110. In one embodiment, client application 128 is included as part of a suite of applications which include, but not limited to, business intelligence tools, database management tools, metadata management and retrieval tools, reporting tools, and analysis tools used by business professionals for data mining, online analytical processing, and market research. In some embodiments, client application 128 is an associated client application created by the vendor or developer of DBMS 122 for use in a server-client environment. In one embodiment, client application 128 uses a graphical notation to construct data integration solutions with icons for data source 112 and data target 116, and a related query or job stream of data load instructions. In the depicted environment, client application 128 uses a user interface, such as UI 130, to receive user input, and to output responses to a user. In the depicted embodiment, client application 128 is an application allowing authorized users, such as database developers and architects, to request DBMS 122 to perform an index suspension analysis and, based on the results, DBMS 122 suspends index 118, performs an ETL operation, and then rebuilds or actuates index 118 of data target 116 on server computer 104. In one embodiment, the request to perform an index suspension analysis for index 118 is included in a job stream built with client application 128. In another embodiment, the request to perform an index suspension analysis for index 118 is included within SQL commands entered via UI 130.

In one embodiment, client computer 108 includes an instance of a user interface, for example, UI 130, within client application 128. In one embodiment, UI 130 utilizes a web page application, a command line processor, or any other graphical user interface (GUI). UI 130 includes components used to receive input from a user and transmit the input to client application 128 residing on client computer 108. In an embodiment, UI 130 uses a combination of technologies and devices, such as device drivers, to provide a platform to enable users of client computer 108 to interact with client application 128. In an embodiment, UI 130 receives input, such as dragging and dropping data icons onto a workspace using a physical input device, such as a keyboard or mouse, via a device driver that corresponds to the physical input device.

In an embodiment, client application 128 receives from a user, via UI 130, the database location information and validation credentials for access to data source 112 and data target 116 with the added authorization to suspend or actuate index 118. Client application 128 transmits the validation credentials to DBMS 122 on server computer 106 via network 110. In data target 116, index 118 references specific columns within a table (not shown). Client application 128 allows the user to request DBMS 122 to suspend or actuate index 118 for the table in data target 116. In response, DBMS 122 sets an indicator, such as a status flag, for index 118 within system catalog 120 to indicate a status of ACTIVE, SUSPEND, or SUSPEND-PENDING. Client application 128 allows the user to specify one or more parameters or options related to suspending index 118 including, but not limited to, an immediate suspend option, a delayed suspend option based on the first update, a temporal option, a first access option, and a scheduled batch job option. In one embodiment, client application 128 submits the request to suspend or actuate index 118 in the form of an SQL command keyed manually through a command line processor, generated automatically by client application 128 from user input. In another embodiment, client application 128 submits the request to suspend or actuate index 118 by including the request as part of an automated batch job or job stream. One skilled in the art will recognize that there are other ways to submit such a request to suspend or actuate index 118.

In an embodiment, a module of DBMS 122 receives a request from client application 128 or from another module of DBMS 122, to modify data target 116 based on commands such as SQL statements. Using incremental updating, each time DBMS 122 modifies data target 116, such that a column of a table, which index 118 uses as an identifier, requires updating. DBMS 122 also modifies index 118 in accordance with the modification and the status flag for index 118. For example, if the status flag for index 118 indicates a status of ACTIVE, then DBMS 122 modifies index 118 in accordance with the changes made to data target 116, i.e., index 118 is modified to reflect the current state of data target 116. However, if the status flag for index 118 indicates a status of SUSPEND or SUSPEND-PENDING, then DBMS 122 does not modify index 118.

In an embodiment, DBMS 122 receives a request from a requestor, such as client application 128, to actuate index 118 for data target 116. If the status flag for index 118 indicates a status of SUSPEND, then DBMS 122 rebuilds index 118 based on metadata that defines index 118, and sets the status flag to indicate a status of ACTIVE for index 118 in system catalog 120. Such metadata is stored as part of system catalog 120. However, if the status flag for index 118 indicates a status of SUSPEND-PENDING, then DBMS 122 sets the status flag to indicate a status of ACTIVE in system catalog 120.

Figure 2:
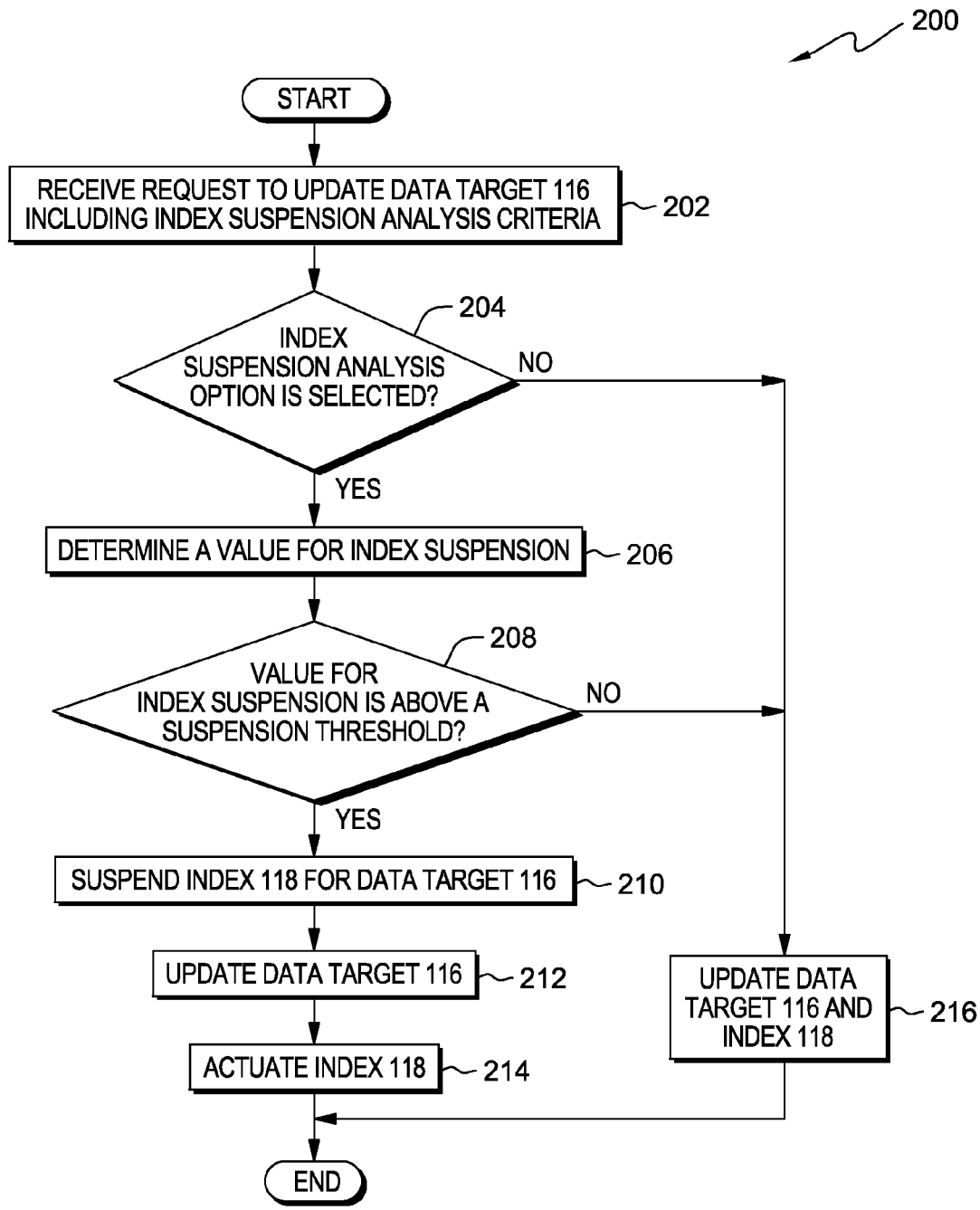
FIG. 2 is a flowchart depicting the operational steps for suspending a database index using index suspension analysis, in accordance with an embodiment of the present invention.

In an embodiment, DBMS 122 receives a request to suspend index 118, from client application 128 or from within DBMS 122, in response to a result generated from an index suspension analysis. In an embodiment, such index suspension analysis are based, at least in part, on a pending quantity of changes of an ETL job that will move selected data from data source 112 to data target 116. In an embodiment, DBMS 122 determines to suspend index 118 based, at least in part, on the calculation of an index suspension value, and the subsequent comparison of the index suspension value to a threshold value. FIG. 2 further describes an operational flow for index suspension using index suspension analysis.

Figure 3:
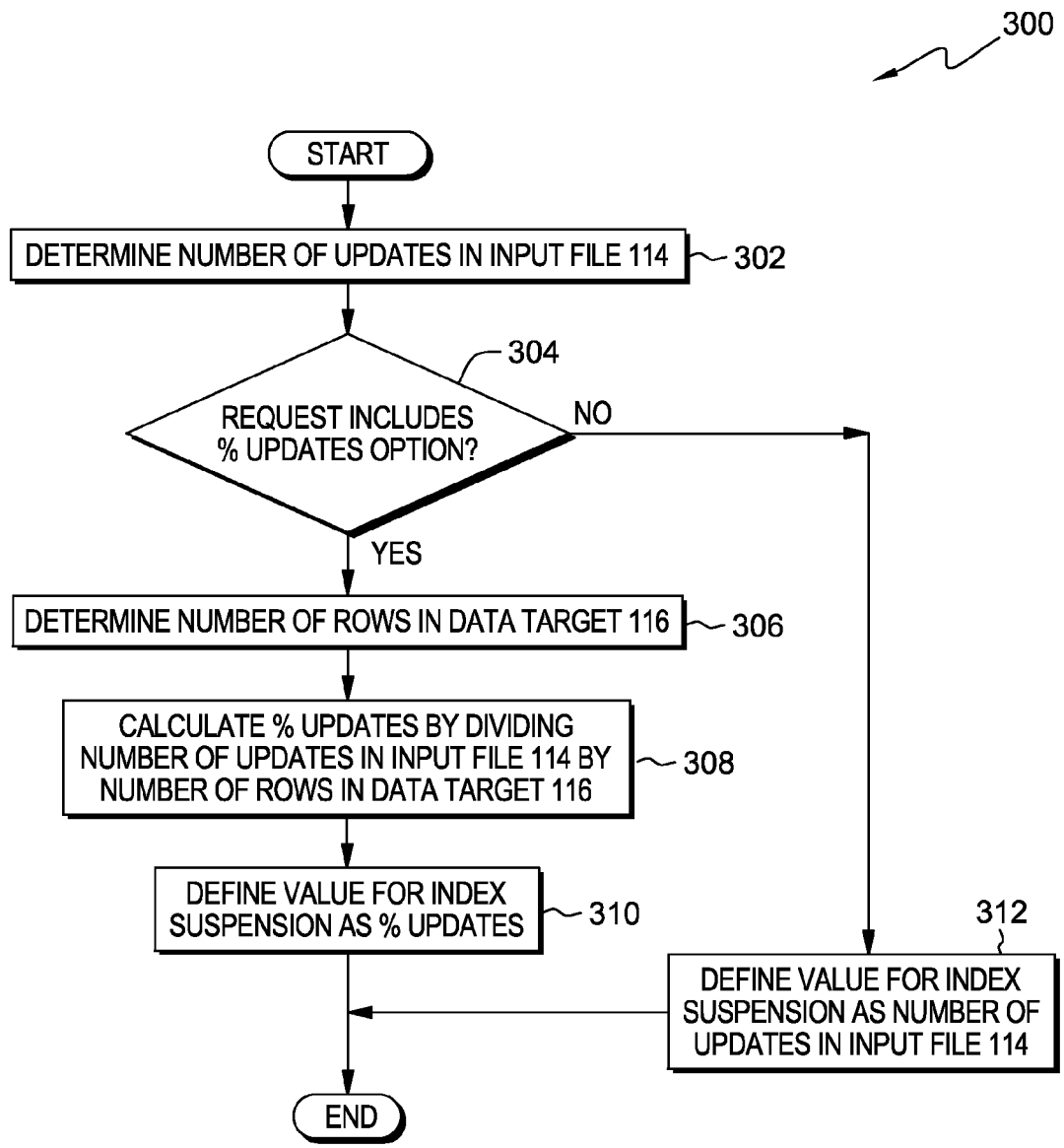
FIG. 3 is a flowchart depicting the operational steps for calculating an index suspension value, in accordance with an embodiment of the present invention.

In one embodiment, DBMS 122 determines the index suspension value from a fixed count of updates. In another embodiment, DBMS 122 calculates the index suspension value as a fraction or percentage of updates scheduled for data target 116. FIG. 3 further describes an operation flow for the calculation of the index suspension value.

In an embodiment, the requests for suspension of index 118 utilize temporal limits. In some embodiments, such temporal limits dictate when and how DBMS 122 performs analysis of updates prior to performing the plurality of updates to the database. Upon reaching that temporal limit, DBMS 122 performs the specified actions. For example, DBMS 122 receives a request for index suspension analysis on index 118, which includes a temporal limit parameter. If the ETL jobs run every Tuesday historically have a low percentage of updates to load into data target 116, then a parameter in the request is set to bypass the index suspension analysis on Tuesdays.

In one embodiment, DBMS 122 receives a request for index suspension analysis from client application 128 in the form of an enhanced ETL application. In another embodiment, DBMS 122 receives the request for index suspension analysis from client application 128 in the form of an enhanced SQL command. In one embodiment, DBMS 122 includes SQL interface 124 capable of interpreting parameters for requesting index suspension analysis.

FIG. 2 is a flowchart depicting the operational steps for suspending database index 118 using index suspension analysis, in accordance with an embodiment of the present invention. Flow 200 depicts DBMS 122 suspending index 118 of data target 116 based on index suspension analysis. In one embodiment, the suspension of index 118 is a function of DBMS 122 that DBMS 122 automatically activates based, at least in part, on changes made to data target 116. In one embodiment, DBMS 122 on server computer 106 also enables a user of client application 128 on client computer 108 to request suspension of index 118 for a table within data target 116. In alternate embodiments, DBMS 122 enables users to request the suspension of one or more indices of a specific table within data target 116. Flow 200 depicted in FIG. 2 is merely an illustration and, as such, does not indicate a limit as to the number of indices suspended at one time.

Initially, DBMS 122 on server computer 106 receives credentials from a user of server computer 106 or client computer 108 for validation. A person of ordinary skill in the art would recognize that, in some instances, users, such as database administrators or developers, of client application 128 on client computer 108, or of DBMS 122 on server computer 106, would request validation of credentials before accessing data target 116 on server computer 104, and make updates to the information stored therein. In various embodiments, DBMS 122 provides for a user specific authority for suspending and actuating indices on data target 116. Responsive to determining that the user has the proper authority, DBMS 122 performs the requested tasks. If the user does not have the proper authority, then DBMS 122 does not perform tasks that involve suspending indices.

DBMS 122 receives a request to update data target 116 including index suspension analysis criteria (step 202). DBMS 122 on server computer 106 receives a request from a user of client application 128 on client computer 108 with details to update data target 116 with data extracted from data source 112, such as data in input file 114. The request comprises a command or parameter to suspend index 118 for data target 116. In one embodiment, the command or parameter to suspend index 118 for data target 116 are based on received criteria for index suspension analysis, including at least a selectable option for performing index suspension analysis. In some embodiments, the request includes a suspension threshold for a value for index suspension that DBMS 122 uses to determine if index 118 is to be suspended.

In an embodiment, prior to transmitting the request to DBMS 122, client application 128 receives the request as an SQL statement from a user via UI 130. In an embodiment, prior to transmitting the request to DBMS 122, client application 128 generates an SQL statement from input received from the user via UI 130. In another embodiment, DBMS 122 receives the request from an ETL batch job created by client application 128. In an alternate embodiment, DBMS 122 receives the request to suspend index 118 from UI 126, which allows a user of server computer 106, such as a database administrator, to submit the request to suspend index 118 using a command line processor. A person of ordinary skill in the art would recognize that there are many forms of a suspension request, including an SQL command.

In alternate embodiments, the request describing suspension of one or more indices, includes all of or a sub-set of indices for a database table. In an embodiment, such a sub-set of indices includes either one or both of an inclusion and an exclusion list. In an embodiment, the request includes a list of one or more indices belonging to more than one database table in a database. For simplicity, the embodiment of FIG. 2 shows suspending a single index, index 118, but one skilled in the art will recognize the ability to suspend more than one index.

In an embodiment, DBMS 122 determines whether an option for index suspension analysis is selected (decision block 204). In an embodiment, the received request includes a parameter indicating the selection of an option for index suspension analysis regarding index 118. In an embodiment, if DBMS 122 confirms the selection of an option for index suspension analysis, then DBMS 122 performs the index suspension analysis to determine whether to suspend index 118. As such, if DBMS 122 determines that an option for index suspension analysis was selected (yes branch, decision block 204), then DBMS 122 determines a value for index suspension (in step 206), e.g., a specific quantity of changes that will, if met, trigger index suspension. DBMS 122 determines a value for index suspension comprising one or both of a percentage of updates and number of updates. In general, a percentage or a hard count represents the value for index suspension, which further indicates the quantity of changes scheduled for data target 116. The determination follows flow, 300, as depicted and described in FIG. 3.

DBMS 122 determines if the value for index suspension is above a suspension threshold (decision block 208). In some embodiment, if the value for index suspension is equal to or within a pre-specified proximity to the suspension threshold, then DBMS 122 determines that the value for index suspension is above the suspension threshold. The determination involves a comparison of two numerical values comprising the value of index suspension and the suspension threshold. The suspension threshold represents a numeric value above which DBMS 122 suspends index 118. The suspension threshold has the same units as the value for index suspension. In one embodiment, the suspension threshold is stored in system catalog 120 as a parameter related to index 118, to data target 116, or a sub-set of data target 116, such as a table. A database administrator or application developer defines the suspension threshold upon creation of data target 116. In other embodiments, DBMS 122 updates the suspension threshold for existing databases as needed. In an alternate embodiment, the received request to suspend index 118 comprise a parameter defining the suspension threshold, which overrides any default value stored in system catalog 120.

If DBMS 122 determines that the value for index suspension is above the suspension threshold (yes branch, decision block 208), then DBMS 122 suspends index 118 for data target 116 (step 210). DBMS 122 stores metadata that defines index 118 as part of system catalog 120. In some embodiments, DBMS 122 also clears or deletes index 118 after the metadata is stored. In some cases, the clearing or deleting of index is limited to the deletion of pointers included in index 118. To delete index 118, DBMS 122 clears out the contents of index 118, or physically deletes index 118, while retaining any related metadata that defines, in part, index 118 to allow the subsequent rebuilding of index 118. When initially created, DBMS 122 defines index 118 with an SQL command entered by a DBA. The SQL command is stored in system catalog 120 as part of a definition for index 118, which DBMS 122 uses to rebuild index 118 when requested. In some embodiments, after index 118 is cleared or deleted, DBMS 122 updates an indicator in system catalog 120, such as a status flag, for index 118 to indicate a status of SUSPEND. The query optimizer component of DBMS 122 uses the status flag to determine if index 118 is available for use when processing a query, such as a read, insert, update, or delete operation.

DBMS 122 updates data target 116 (step 212). In one embodiment, DBMS 122 performs the ETL batch job included in the initial request of step 202. In another embodiment, DBMS 122 performs the query or SQL statement received from a command line processor via UI 126 or UI 130. In an alternate embodiment, DBMS 122 processes the changes from input file 114 into data target 116. Since index 118 is in a state of suspension, DBMS 122 will bypass the incremental updates to index 118 related to the changes in data target 116 resulting from the ETL job.

DBMS 122 actuates index 118 (step 214). DBMS 122 triggers the rebuilding of index 118. DBMS 122 rebuilds index 118 based on metadata stored in system catalog 120. At this point, the request has completed, and processing ends. After the completion of rebuilding index 118, DBMS 122 updates the status flag in system catalog 120 to indicate that index 118 is in ACTIVE status. After setting index 118 to indicate an ACTIVE status, index 118 is now available to the query optimizer of DBMS 122 for determining access paths as needed.

Returning to decision block 204, if DBMS 122 determines that an index suspension analysis option is not selected (no branch, decision block 204), then DBMS 122 updates data target 116 and index 118 (step 216). DBMS 122 updates data target 116 per the ETL job included in the initial request of step 202. Since index 118 is in an ACTIVE state, DBMS 122 performs any incremental updates to index 118 related to changes in data target 116 resulting from the ETL job. At this point, the request has completed, and processing ends.

Returning to decision block 208, if DBMS 122 determines that the value for index suspension is not above a suspension threshold (no branch, decision block 208), then DBMS 122 updates data target 116 and index 118 (step 216). DBMS 122 updates data target 116 per the ETL job included in the initial request of step 202. Since index 118 is in an ACTIVE state, DBMS 122 performs any incremental updates to index 118 related to changes in data target 116 resulting from the ETL job. At this point, the request has completed, and processing ends.

FIG. 3 is a flowchart depicting the operational steps for calculating an index suspension value, in accordance with an embodiment of the present invention. Flow 300 depicts details for determining an index suspension value, as described in step 206 of flow 200 and depicted in FIG. 2 above. In the embodiment of FIG. 3, the requested changes to be loaded into data target 116 are depicted as a large external data file, such as input file 114 on server computer 102. One skilled in the art will understand that, in some instances, there are many methods to receive requested changes.

DBMS 122 determines a number of updates in input file 114 (step 302). If input file 114 comprises one record per line, DBMS 122 estimates or counts the number of updates using a system command, which counts the number of rows in the file. In an alternate embodiment where the changes comprise SQL insert commands issued with explicit values, DBMS 122 pre-processes the command and counts the number of records scheduled for insertion, based on the syntax of the command. In an embodiment, DBMS 122 utilizes database statistics, table scans, and database indices for counting the number of updates requested for data target 116. One skilled in the art will recognize that there are other ways to estimate or count the number of updates requested for data target 116.

DBMS 122 determines if the request includes a percentage of updates option (decision block 304). If DBMS 122 determines that the request does not include a percentage of updates option (no branch, decision block 304), then DBMS 122 defines the value for index suspension as the number of updates in input file 114 (step 312). In an embodiment, DBMS 122 assigns the number of updates in input file 114 determined in step 302 to the value for index suspension to be used in step 206 of flow 200, as depicted and described in FIG. 2. At this point, the request has completed, and processing ends.

Returning to decision block 304, if DBMS 122 determines that the request includes a percentage of updates option (yes branch, decision block 304), then DBMS 122 determines the number of rows in data target 116 (step 306). In an embodiment, DBMS 122 utilizes database statistics, table scans, and database indices for counting the number of rows in data target 116. One skilled in the art will recognize that there are other ways to estimate or count the number of rows in data target 116.

DBMS 122 calculates the percentage of updates by dividing the number of updates in input file 114 by the number of rows in data target 116 (step 308). In an embodiment, a fraction or percentage of updates is calculated by taking the number of updates in input file 114 (from step 302) and dividing by the number of rows in data target 116 (from step 306). The units of percentage of updates match the units of the suspension threshold.

DBMS 122 defines the value for index suspension as the percentage of updates (step 310). DBMS 122 assigns the percentage of updates (determined in step 308) to the value for index suspension, as used in step 206 of flow 200 depicted and described in FIG. 2. At this point, the request has completed, and processing ends.

Figure 4:
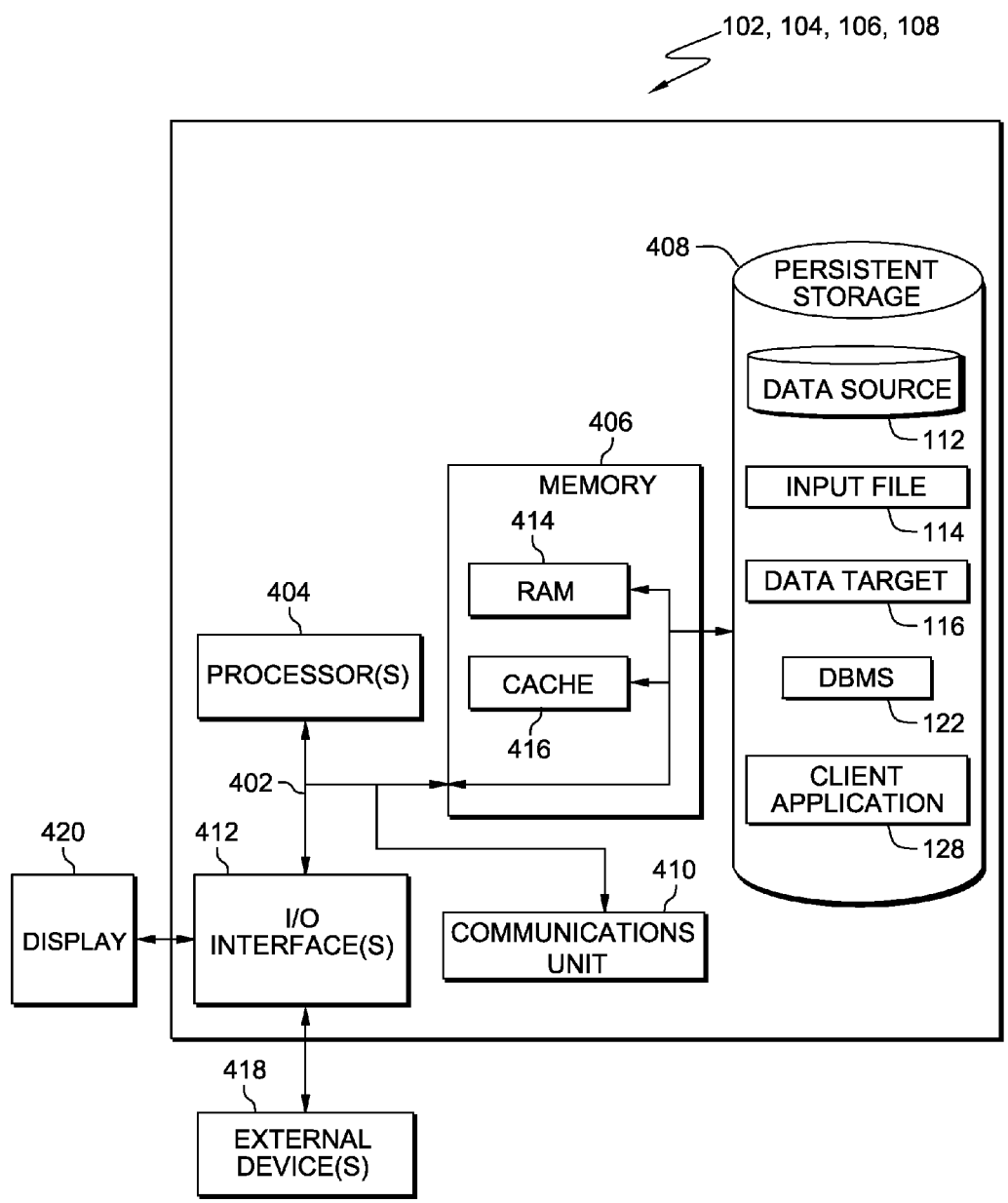
FIG. 4 depicts a block diagram of components of a computer system, in accordance with an embodiment of the present invention.

FIG. 4 depicts a block diagram of respective components of server computers 102, 104, and 106, and client computer 108, in accordance with an embodiment of the present invention. It is to be appreciated that FIG. 4 provides only an illustration of one implementation and does not imply any limitations with regard to the environments in which different embodiments may be implemented. Many modifications to the depicted environment are possible.

Server computers 102, 104, and 106 and client computer 108, each include respective communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

DBMS 122, data source 112, input file 114, data target 116, and client application 128 are stored in respective persistent storage 408 for execution and/or access by one or more of the further respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that are also part of persistent storage 408.

Communications unit 410, in these examples, provides for communications with other data processing systems or devices, including resources of server computers 102, 104, and 106, and client computer 108. In these examples, communications unit 410 includes one or more network interface cards. Communications unit 410 may provide communications using either or both physical and wireless communications links. DBMS 122, data source 112, input file 114, data target 116, and client application 128 may be downloaded to respective persistent storage 408 through communications unit 410.

I/O interface(s) 412 allows for input and output of data with other devices that may be connected to server computers 102, 104, and 106, and client computer 108. For example, I/O interface 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data used to practice embodiments of the present invention, e.g., DBMS 122, data source 112, input file 114, data target 116, and client application 128, can be stored on such portable computer readable storage media and can be loaded onto respective persistent storage 408 via I/O interface(s) 412. I/O interface(s) 412 also connect to a display 420.

Display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially, concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for suspending and activating a database index, the method comprising:
   receiving, by a computer, a request that includes (i) a plurality of updates to be performed to a database and (ii) a suspension threshold value;
   prior to processing plurality of updates for the database:
   determining, by the computer, a quantity of changes for a number of rows of a database that are to be made by an update included in the plurality of updates;
   determining, by the computer, whether to suspend an index of the database based, at least in part, on a comparison between the quantity of changes and the suspension threshold value that is configured to control, at least in part, suspension of an index of the database; and
   suspending, by the computer, the index of the database based, at least in part, on a result of the comparison that indicates the quantity of changes at least meet the suspension threshold value, wherein a suspension of the index of the database initiates a rebuilding of the index.

2. The method of claim 1, the method further comprising:
updating, by the computer, the index of the database based, at least in part, on a result of the comparison that indicates that the quantity of changes does not meet the suspension threshold value, wherein the index is not suspended.

3. The method of claim 1, wherein suspending the index further comprises:
retaining, by the computer, a definition for the index of the database, wherein the definition includes a command for rebuilding the index of the database;
deleting, by the computer, the index of the database; and
rebuilding, by the computer, the index of the database using the definition, in response to a completion of a plurality of updates to the database.

4. The method of claim 1, the method further comprising:
receiving, by the computer, a selection to perform an analysis of the plurality of updates, wherein results of the analysis indicate whether to suspend the index of the database; and
determining, by the computer, the quantity of changes based, at least in part, on the received plurality of updates.

5. The method of claim 4, the method further comprising:
determining, by the computer, a count of updates for the database from the plurality of updates to be performed to the database, wherein the count of updates for the database is a numerical value based, at least in part, on a number of rows of data from an input file; and
determining, by the computer, the quantity of changes based, at least in part, on the count of updates for the database.

6. The method of claim 4, the method further comprising:
determining, by the computer, a count of updates for the database based, at least in part, the plurality of updates to be performed to the database, wherein the count of updates for the database is a numerical value based, at least in part, on a number of rows of data from an input file;
determining, by the computer, an initial number of rows of data in the database;
determining, by the computer, a percentage of updates for the database by dividing the count of updates for the database by the initial number of rows of data in the database; and
determining, by the computer, the quantity of changes based, at least in part, on the percentage of updates for the database.

7. The method of claim 4, the method further comprising:
receiving, by the computer, a temporal limit, wherein the temporal limit dictates when the computer performs the analysis of the plurality of updates; and
performing, by the computer, the analysis of the plurality of updates prior to performing the plurality of updates to the database in response to meeting the temporal limit.

8. A computer program product for suspending and activating a database index, the computer program product comprising:
a computer readable storage medium and program instructions stored on the computer readable storage medium, the program instructions comprising:
program instructions to receive a request that includes (i) a plurality of updates to be performed to the database and (ii) a suspension threshold value;
program instructions to, prior to processing the plurality of updates, determine a quantity of changes for a number of rows of a database that are to be made by an update included in the plurality of updates;
program instructions to, prior to processing the plurality of updates, determine whether to suspend an index of the database based, at least in part, on a comparison between the quantity of changes and the suspension threshold value that is configured to control, at least in part, suspension of an index of the database; and
program instructions to, prior to processing the plurality of updates, suspend the index of the database based, at least in part, on a result of the comparison that indicates the quantity of changes at least meet the suspension threshold value, wherein a suspension of the index of the database initiates a rebuilding of the index.

9. The computer program product of claim 8, the program instructions further comprising:
program instructions to update the index of the database based, at least in part, on a result of the comparison that indicates that the quantity of changes does not meet the suspension threshold value, wherein the index is not suspended.

10. The computer program product of claim 8, wherein the program instructions to suspend the index further comprise:
program instructions to retain a definition for the index of the database, wherein the definition includes a command for rebuilding the index of the database;
program instructions to delete the index of the database; and
program instructions to respond to a completion of a plurality of updates to the database by rebuilding the index of the database using the definition.

11. The computer program product of claim 8, the program instructions further comprising:
program instructions to receive a selection to perform an analysis of the plurality of updates, wherein results of the analysis indicate whether to suspend the index of the database; and
program instructions to determine the quantity of changes based, at least in part, on the received plurality of updates.

12. The computer program product of claim 11, the program instructions further comprising:
program instructions to determine a count of updates for the database from the plurality of updates to be performed to the database, wherein the count of updates for the database is a numerical value based, at least in part, on a number of rows of data from an input file; and
program instructions to determine the quantity of changes based, at least in part, on the count of updates for the database.

13. The computer program product of claim 11, the program instructions further comprising:
program instructions to determine a count of updates for the database based, at least in part, on the plurality of updates to be performed to the database, wherein the count of updates for the database is a numerical value based, at least in part, on a number of rows of data from an input file;

program instructions to determine an initial number of rows of data in the database;

program instructions to determine a percentage of updates for the database by dividing the count of updates for the database by the initial number of rows of data in the database; and program instructions to determine the quantity of changes, based, at least in part, on the percentage of updates for the database.

14. The computer program product of claim 11, the program instructions further comprising:

program instructions to receive a temporal limit, wherein the temporal limit dictates when the computer performs the analysis of the plurality of updates; and program instructions to respond to meeting the temporal limit by performing the analysis of the plurality of updates prior to performing the plurality of updates to the database.

15. A computer system for suspending and activating a database index, the computer system comprising:

one or more computer processors;

one or more computer readable storage media;

program instructions stored on the computer readable storage media for execution by at least one of the one or more processors, the program instructions comprising:

program instructions to receive a request that includes (i) a plurality of updates to be performed to the database and (ii) a suspension threshold value;

program instructions to, prior to processing the plurality of updates, determine a quantity of changes for a number of rows of a database that are to be made by an update included in the plurality of updates;

program instructions to, prior to processing the plurality of updates, determine whether to suspend an index of the database based, at least in part, on a comparison between the quantity of changes and the suspension threshold value that is configured to control, at least in part, suspension of an index of the database; and program instructions to, prior to processing the plurality of updates, suspend the index of the database based, at least in part, on a result of the comparison that indicates the quantity of changes at least meet the suspension threshold value, wherein a suspension of the index of the database initiates a rebuilding of the index.

16. The computer system of claim 15, the program instructions further comprising:

program instructions to update the index of the database based, at least in part, on a result of the comparison that indicates that the quantity of changes does not meet the suspension threshold value, wherein the index is not suspended.

17. The computer system of claim 15, wherein the program instructions to suspend the index further comprise:

program instructions to retain a definition for the index of the database, wherein the definition includes a command for rebuilding the index of the database;

program instructions to delete the index of the database; and program instructions to respond to a completion of a plurality of updates to the database by rebuilding the index of the database using the definition.

18. The computer system of claim 15, the program instructions further comprising:

program instructions to receive a selection to perform an analysis of the plurality of updates, wherein results of the analysis indicate whether to suspend the index of the database; and program instructions to determine the quantity of changes based, at least in part, on the received plurality of updates.

19. The computer system of claim 15, the program instructions further comprising:

program instructions to determine a count of updates for the database from the plurality of updates to be performed to the database, wherein the count of updates for the database is a numerical value based, at least in part, on a number of rows of data from an input file; and program instructions to determine the quantity of changes based, at least in part, on the count of updates for the database.

20. The computer system of claim 15, the program instructions further comprising:

program instructions to receive a temporal limit, wherein the temporal limit dictates when the computer performs the analysis of the plurality of updates; and program instructions to respond to reaching the temporal limit by performing the analysis of the plurality of updates prior to performing the plurality of updates to the database.

* * * * *